(12) United States Patent
Delgado et al.

(10) Patent No.: US 10,257,789 B2
(45) Date of Patent: Apr. 9, 2019

(54) METHOD AND DEVICE FOR DETERMINING TRANSMIT POWER

(71) Applicant: TELEFONAKTIEBOLAGET LM ERICSSON (PUBL), Stockholm (SE)

(72) Inventors: Ramon Delgado, Elermore Vale (AU); Katrina Lau, Wallsend (AU); Richard Middleton, North Lambton (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/555,919

(22) PCT Filed: Mar. 5, 2015

(86) PCT No.: PCT/SE2015/050246
§ 371 (c)(1),
(2) Date: Sep. 5, 2017

(87) PCT Pub. No.: WO2016/140606
PCT Pub. Date: Sep. 9, 2016

(65) Prior Publication Data
US 2018/0041972 A1    Feb. 8, 2018

(51) Int. Cl.
*H04W 52/28*  (2009.01)
*H04W 52/14*  (2009.01)
(Continued)

(52) U.S. Cl.
CPC ....... *H04W 52/283* (2013.01); *H04W 52/143* (2013.01); *H04W 52/225* (2013.01); *H04W 52/242* (2013.01)

(58) Field of Classification Search
CPC ............. H04W 52/143; H04W 52/242; H04W 52/283; H04W 52/225
USPC ... 455/522, 69, 68, 500, 517, 561, 508, 507, 455/67.11, 422.1, 403, 515, 426.1, 426.2; 370/310, 312, 338, 328, 329
See application file for complete search history.

(56) References Cited

U.S. PATENT DOCUMENTS 8,976,662 B2 *  3/2015  Somasundaram .... H04W 16/26
                                                   370/235
2007/0042784 A1    2/2007  Anderson
(Continued)

FOREIGN PATENT DOCUMENTS

WO    2006004968 A2    1/2006
WO    2013109181 A2    7/2013

*Primary Examiner* — Keith Ferguson
(74) *Attorney, Agent, or Firm* — Sage Patent Group (57) ABSTRACT

There is provided a method performed by a network node for determining the transmit power to be used on a physical channel. The method comprises the step of obtaining values for the geometry factors G of a set of User Equipments, UEs. The method also comprises the step of creating, based on the obtained geometry factors and representations of the statistical moments of the geometry factors, a statistical measure $G^*$ for the set of UEs. The method also comprises the step of determining a value representing the transmission power for physical channel transmissions based on a power control expression for physical channel transmissions comprising the statistical measure $G^*$ for the set of UEs, and setting the transmission power to the determined value. A corresponding network node and a corresponding computer program is also provided.

18 Claims, 8 Drawing Sheets

(51) Int. Cl.
*H04W 52/22* (2009.01)
*H04W 52/24* (2009.01)

(56) References Cited

U.S. PATENT DOCUMENTS

2014/0086072 A1* 3/2014 Maaref ............... H04W 52/343
370/252
2015/0110068 A1* 4/2015 Yang ................. H04W 36/0061
370/331

* cited by examiner

METHOD AND DEVICE FOR DETERMINING TRANSMIT POWER

This application is a 371 of International Application No. PCT/SE2015/050246, filed Mar. 5, 2015, the disclosure of which is fully incorporated herein by reference.

TECHNICAL FIELD

The proposed technology generally relates to method and devices for determining the transmit power to be used for transmissions on physical channels. The proposed technology also relates to a corresponding computer program.

BACKGROUND

An efficient wireless communication between a receiver and a transmitter in a network benefits from suitable chosen power levels for the transmission. Since all signals transmitted during wireless communication experiences power drops on their way to the receiver, the received signal may be too weak to decode if the assigned power level of the transmitter did not take the power drop into consideration. A number of power control mechanisms have been developed in order to ensure that the power levels are chosen to reduce the number of received but un-decodable signals as well as ensuring that the receiver is not saturated by too high transmission power. Particular developments relates to closed- and open loop power control. Closed loop power control relies, in broad terms, on a feed-back mechanism where the transmitter transmits a signal or a reference signal to the receiver which in turn measure the received signal power and report back. Based on the reported measurement the transmitter is able to tune the transmit power to finally land on a suitable power level. This cyclic power control mechanism is performed frequently and it may be performed up to 1000 times per second in a Long Term Evolution network, LTE network. This however does not solve all the problems, there may be cases where a particular UE, without knowledge of the power loss levels in the system, needs to transmit a signal to a base station that carries enough power to enable the base station to decode it. Open loop power control has been developed in order to solve problems like this. A simple form of open loop power control consists of a step where a network node, for example a base station, transmits a reference signal together with information about the power level used when transmitting the reference signal. A User Equipment, UE, receives the reference signal and measures the received power level. By comparing the measured value with the power level information provided in the reference signal the UE is able to approximate the signal path loss between the reference signal transmitting network node and the UE. In general the reference signal will also comprise a value that gives the maximum power that the UE is allowed to use when transmitting. The information provided by the reference signal and the measurement enables the UE to figure out at least a coarse-grained value for the power level to be used when transmitting signals to the network node. In order to avoid that the UE always uses the maximum transmit power allowed, something that will lead to unnecessary power drain, and hence negatively affect the UE performance, various power control expressions has been developed in order to increase the chances that the UE is assigned a transmit power level that uses as little power as possible while at the same time uses as much power as is needed to transmit a signal that can be decoded on the receiving side. The developed power control expressions provide complicated parametrical expressions that incorporates various dynamical phenomena that can lead to path losses and other power degrading effects. Hence by using power control expressions to extract suitable transmit power levels the chances increases that the UE will use a suitable power level. In order to further improve the accuracy when using power control expressions it is important that the parametrical part of the expressions gives a valid picture of the effects that may influence the choice of transmit power.

SUMMARY

It is an object of the proposed technology to provide mechanisms that further improves power control processes. It is a particular object to provide mechanisms that determines the transmit power to be used for transmissions on physical channels based partially on parameters associated with the geometry factors of the network. The proposed technology aims to further increase the reliability of the power control and improve the accuracy when determining the transmit power to be used for transmissions on a physical channel.

These and other objects are met by embodiments of the proposed technology.

A first aspect of the proposed technology provides a method performed by a network node for determining the transmit power to be used for transmissions on physical channels. The method comprises the step of obtaining values for the geometry factors G of a set of User Equipments, UEs. The method also comprises the step of creating, based on the obtained geometry factors and representations of the statistical moments of the geometry factors, a statistical measure G* for the set of UEs. The method also comprises the step of determining a value representing the transmission power for physical channel transmissions based on a power control expression for physical channel transmissions comprising the statistical measure G* for said set of UEs, and setting the transmission power to the determined value.

A second aspect of the proposed technology provides a network node configured to determine the transmit power to be used for transmissions on physical channels. The network node is configured to obtain values for the geometry factors G of a set of User Equipments, UEs. The network node is also configured to create, based on the obtained geometry factors and representations of the statistical moments of the geometry factors, a statistical measure G* for the set of UEs. The network node is also configured to determine a value representing the transmission power for physical channel transmissions based on a power control expression for physical channel transmissions comprising the statistical measure G* for said set of UEs, and setting the transmission power to the determined value.

A third aspect of the proposed technology provides a computer program comprising instructions, which when executed by at least one processor, cause the processor(s) to:

read information related to the values of the geometry factors G of a set of User Equipments, UEs, and compute, based on the obtained geometry factor values, representations of the statistical moments of the geometry factors, and construct, based on the obtained geometry factor values G, and the representations of the statistical moment of the geometry factors, a statistical measure G* for the set of UEs;

determine a value representing the transmission power for physical channel transmissions based on a power control expression for physical channel transmissions comprising the statistical measure G* for the set of UEs, and setting the transmission power to the determined value.

A fourth aspect of the proposed technology provides a network node configured to determine the transmit power to be used for transmissions on physical channels. The network node comprises an obtaining module for obtaining values for the geometry factors G of a set of User Equipments, UEs. The network node also comprises a creating module for creating, based on the obtained geometry factor values, representations of the statistical moments of the geometry factors. The network node also comprises a constructing module for constructing, based on the obtained geometry factor values G and the created representations of the statistical moments of the geometry factors a statistical measure G* for the set of UEs. The network node further comprises a determining module for determining a value representing the transmission power for physical channel transmissions based on a power control expression for physical channel transmissions comprising the statistical measure G* for the set of UEs, and setting the transmission power to the determined value.

An advantage of the proposed technology is that it enables the determination of a suitable power level to be used for transmissions on physical channels based on geometric information in form of geometry factors. This will provide a more fine-grained power level selection procedure. By providing mechanisms that enables a more detailed power control expression to be used the technology will provide more robust transmissions which increases the chances that a receiver of a signal is able to decode the content carried by the signal. At the same time the proposed mechanism reduces the risk that the transmitter will use the maximally allowed power level when there is no need to. An extensive use of the maximally allowed transmit power will quickly drain the power resources of the transmitter.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the concept of geometry in relation to power control and in particular to the geometry factors that are utilised according to the proposed technology.

The concept of geometry provides additional information about the level of interference generated by each User Equipment, UE in a wireless communication network. This geometry information can be used to provide power control allocations that provide a good trade-off between improving throughput while at the same time keeping fairness between UEs, i.e. distributing the common resources as fair as possible among the UEs. The proposed technology presents a way to include the geometry information into the power control allocation problem. The proposed solution is very simple to setup and yields a reliable transmit power level that takes into consideration the geometry based potential interferences.

The expression geometry factor relates to a measure of the ratio of total transmitted power received by a wireless receiver to the total interference plus noise power at the wireless receiver. The geometry factor of a particular channel is a location or position dependent value that can be provided for each user. It can also be seen as a factor which is a function of the path-gains either to a) a receiver from multiple transmitters or b) from a transmitter to multiple receivers. The geometry factor provides a measure of the ratio of the useful signal power to the interference experienced, as in case a), or generated by a transmitter, as in case b).

According to the proposed technology statistical measures of the geometry factors will be utilised in order to determine the transmit power to be used for transmissions on a physical channel. In other words power control expressions that are used for determining the transmit power will be extended to also incorporate some statistical measure of the geometry factors.

In a particular embodiment of the proposed technology use is made of a normalized mean value of the geometry factors. The inventors have found that a statistical measure in the form of a normalized mean value of the geometry factor values yields several advantages. First of all statistical measure like the normalized mean value reduces the variability of the geometry values between different scenarios, for example isolated indoor and non-isolated stadium scenarios. Additionally, the reduction on variability improves the compatibility of the proposed method with other power control mechanisms. The use of normalized geometry factor values successfully introduces additional information provided by the geometry factors, with reduced secondary effects due to interaction with other power control mechanisms.

Figure 2:
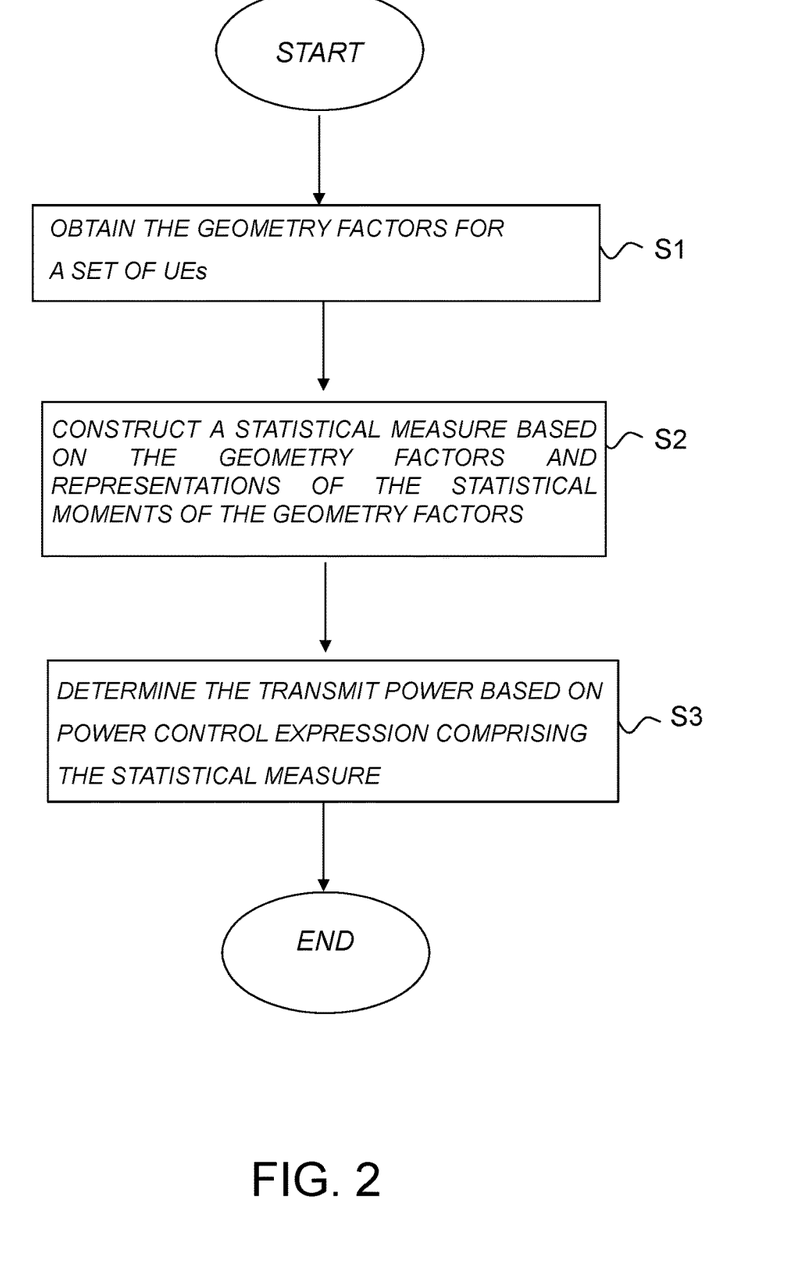
FIG. 2 is a flow diagram illustrating the method for determining the transmit power to be used for transmissions on a physical channel according to the proposed technology.

The proposed technology provides a method performed by a network node for determining the transmit power to be used for transmissions on physical channels. The method comprises the step S1 of obtaining values for the geometry factors G of a set of User Equipments, UEs. The method also comprises a step S2 of creating, based on the obtained geometry factors and representations of the statistical moments of the geometry factors, a statistical measure G* for said set of UEs. The method also comprises the step of determining a value representing the transmission power for physical channel transmissions based on a power control expression for physical channel transmissions comprising the statistical measure G* for said set of UEs, and setting the transmission power to the determined value. The method is schematically illustrated in the flow diagram of FIG. 2.

Stated slightly different, the proposed method provides a mechanism whereby a network node in a wireless communication network can establish what power level to be used for transmissions on a particular physical channel. The proposed technology incorporates additional information in the shape of a statistical measure into a power level expression. The statistical measure G* may be created by utilizing representations of lower order statistical moments such as the mean value and the variance. It is however also possible to use representations of higher order statistical moments in order to make use of as much information as possible. Higher order statistical moments are well defined mathematical expressions that can be used to obtain extra information about distributions. The third order moment, referred to as skewness, may for example be used to obtain a measure of the asymmetry of the geometry factor distribution around the mean value. The fourth order moment, referred to as kurtosis, may instead be used to obtain information about the flatness of the distribution relative a normal or a Gaussian distribution. All higher order moments provide extra information about the distribution which can be incorporated in the created statistical measure G*. The obtained power level expressions will therefore provide a more detailed picture of the dynamics of the network and can thus be used to determine suitable power levels in those cases where geometry considerations in the network are deemed relevant. The geometry factors G may in general be obtained for all possible UEs served by the same or different radio base stations within the wireless communication network. The method may incorporate as much information as possible but satisfactory results are achieved even if the geometry factors of only a subset of the UEs are used. It may for example be the case that only those geometry factors that are sufficiently high will be considered.

The proposed method may be performed by a network node in the shape of a communication station such as a radio base station or an eNodeB in order to provide a User Equipment, UE, with the relevant transmission power to be used. The method may however also be performed by a UE that has been provided with the values of the geometry factors, either in the form of pure geometry factor values or in the shape of a representation of a statistical measure. The UE will in this particular scenario be able to determine the power level to be used by itself.

According to a particular embodiment of the proposed technology there is provided a method wherein the statistical moments comprises the mean value of the geometry factors and the variance of the geometry factors and wherein the representation of the variance comprises the standard deviation. By using a low order statistical moment such as the mean value, which is the first order statistical moment and a representation of the second order moment, the variance, in the form of the standard deviation, one obtains extra information about the geometry distribution that can be used to provide a more fine-grained power control expression that take into consideration also the geometry factors. It should be noted that for a normal, or Gaussian, distribution the mean value and a representation of the variance in the form of the standard deviation may be used to generate also higher order moments.

In still another embodiment of the proposed technology there is provided a method wherein the step of creating a representation of a statistical measure G* for the set of UEs comprises to create a normalized mean value G* of the geometry factors based on the obtained geometry factors, the created mean value and the created standard deviation. This embodiment provides a particular type of statistical measure G* where the statistical measure is represented by the normalized mean value of the geometry factors. The normalized mean value provides a computationally non-demanding statistical measure that gives extra information that can be used in power control expression to enable a power level selection that also takes into account geometrical considerations.

Figure 3:
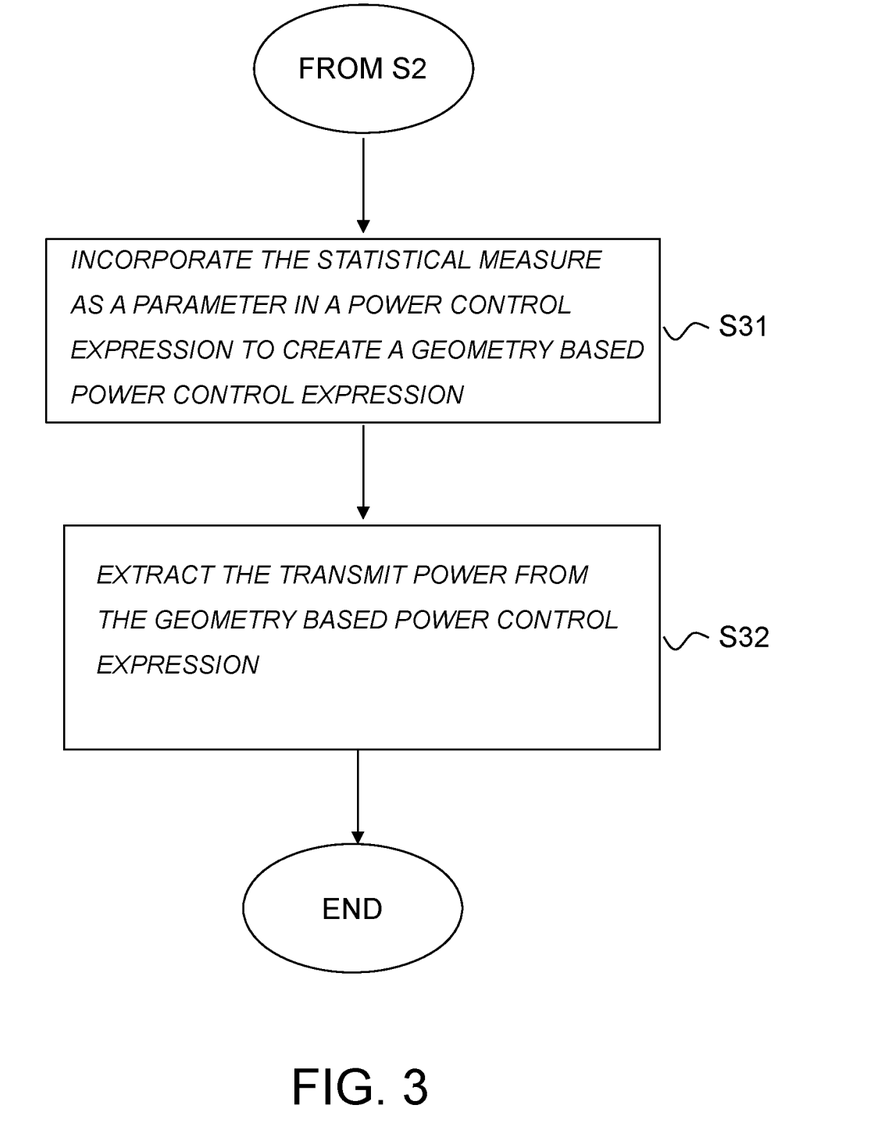
FIG. 3 is a flow diagram illustrating an exemplary embodiment of the method according to the proposed technology.

According to a particular embodiment of the proposed technology there is provided a method wherein the step S3 of determining a value representing the transmission power for physical channel transmissions comprises the further steps of:

incorporating S31 the constructed statistical measure G* as a parameter in a power control expression for physical channel transmissions thereby providing a geometry distribution based power control expression;

extracting S32, from the geometry distribution based power control expression P, a value representing the transmission power for physical channel transmissions and setting the transmission power to the extracted value. This embodiment is schematically illustrated in the flow diagram of FIG. 3.

Figure 8:
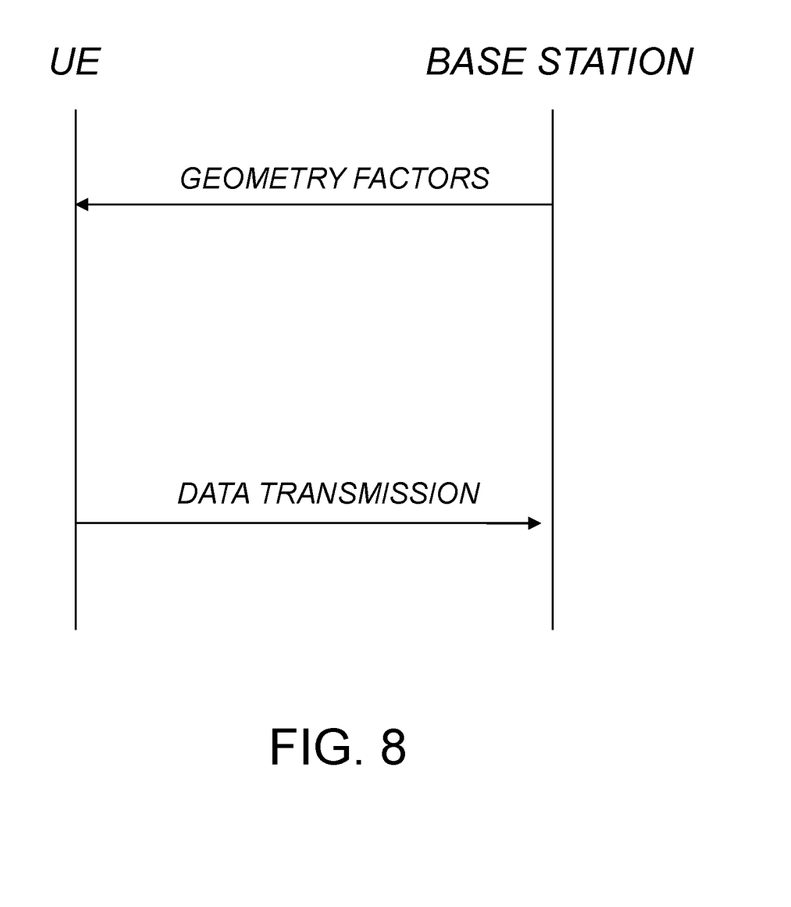
FIG. 8 is a schematic signaling diagram illustrating how a User Equipment is provided with geometry factors from a base station and transmits data to the base station with a power level as determined by the proposed technology.

In other words, the method adds, to known power control expressions for physical channels, the statistical measure in order to obtain an expression that incorporates geometry information. This expression is referred to as a geometry distribution based power control expression. The network node may then extract suitable transmit power from the geometry distribution based power control expression based on some selection mechanism, for example an optimization based selection where the minimum of a power control expression is selected. When the power level has been extracted the network node sets the transmit power to the extracted value. The determined transmit power may then be communicated to a UE in the case a radio base station such as an eNodeB performed the method or used by a UE itself if the UE performed the method. FIG. 8 is a schematic signaling diagram illustrating how a UE is provided with the geometry factors from a base station, and then transmit data back to the radio base station with a transmit power that has been determined according to the proposed technology.

According to an optional embodiment of the proposed technology there is provided a method, wherein the transmission power for the physical channel is determined based on a power control expression comprising the statistical measure G* multiplied with a scaling parameter $\beta$, the scaling parameter enabling the weight given to the statistical measure G* in the power control expression for physical channel transmissions to be altered.

The use of a scaling parameter $\beta$ makes it possible to assign different weights to the geometry information provided by the statistical measure. In certain situations, dependent upon the actual dynamics of the network, geometric information may be considered highly relevant. In situations like these it may be advantageous to give a higher weight to the geometric information. One particular way to achieve this is to assign a higher value to the scaling parameter. That is, assign a value $\beta>1$. If on the other hand geometric considerations are deemed slightly less important it is possible to assign a value $\beta<1$. The scaling parameter therefore provides a means whereby the weights of the geometry values can be dialed up or down based on the particular dynamical situation.

In a particular embodiment of the proposed technology there is provide a method where the statistical measure, or the statistical measure multiplied with the scaling parameter β, is included in a power control expression for transmissions on physical channels in a Long Term Evolution system, LTE system, in order to obtain a geometry distribution based power control for LTE. Specific power control expressions for LTE can be found in, for example Reference [1] TS 36.213 section 5—"Power control". A few examples will be given in a later section of this specification.

Still another embodiment provides a method wherein the transmission power is determined for transmissions on the uplink channel. The method thus provides a mechanism whereby the power to be used by a UE for uplink transmissions can be determined based on power control expression that comprises the statistical measure.

A particular version thus provides a method wherein the transmission power is determined for transmissions on a Physical Uplink Shared Channel, PUSCH.

A specific embodiment of the proposed technology provides a method wherein the transmission power for the uplink channel is obtained from the following expression for the power control for the Physical Uplink Shared Channel, PUSCH:

$$P_{PUSCH} = \min(P_{max}, 10 \log_{10}(M) + P_0 + \alpha(j) \cdot PL + \delta_{MCS} + f + \beta G^*),$$

where, min refers to the smallest of $P_{max}$ or $(10 \log_{10}(M) + P_0 + \alpha(j)PL + \delta_{MCS} + f + \beta G^*)$, and where:

$P_{max}$ represent the maximum transmission power that a network node can use; and where 10 log 10(M) provides a representation of the bandwidth of the PUSCH resource assignment expressed in number of resource blocks; and where $P_0$ provides a representation of the desired or nominal value for $P_{PUSCH}$; and where $\alpha(j)$ provides a representation of the fractional power control parameter; and where PL provides a representation of the downlink path loss as estimated by the network node; and where $\delta_{MCS}$ represents the delta MCS value; and where f is defined by a time dependent recursive form $f(t)=f(t-1)+\delta_{PUSCH}(t-K_{PUSCH})$, where $\delta_{PUSCH}$ denotes a transmit power control, TPC, command to implement closed loop power control, and $K_{PUSCH}$ is the processing delay; and where $\beta G^*$ is the statistical measure $G^*$ multiplied by the scaling parameter β.

As has been described earlier the geometry factor is a function of the path gains either:

(a) to a receiver, from multiple transmitters, or (b) from a transmitter, to multiple receivers.

The geometry factor provides a measure of the ratio of the useful signal power to the interference experienced, as in case a) or generated by a transmitter, as in case b). It is therefore possible to obtain the geometry factors based on signals or data transmitted on either the uplink or the downlink.

In a particular embodiment of the proposed technology there is provide a method wherein the geometry factor values G for the set of UEs are obtained from downlink data. In a specific version of this embodiment there is provided a method wherein a geometry factor value G for a particular user equipment j is obtained from the following expression:

$$G_j^{DL} = 10 \log_{10}\left(\frac{g_{ij}}{\sum_{k \neq i} g_{kj}}\right),$$

where:

$g_{ij}$ represents the path gain between a user equipment j and a serving cell i and the summation runs over all path gains from user equipment j and non-serving cells k.

As an alternative there is provided an embodiment of a method wherein the geometry factor values for the set of UEs are obtained from uplink data. According to a specific version of this embodiment there is provide a method wherein a geometry factor value $G_j$ for a particular user equipment j is obtained from the following expression:

$$G_j^{UL} = 10 \log_{10}\left(\frac{g_{ij}}{\sum_{k \neq i} g_{ik}}\right),$$

where:

$g_{ij}$ represents the path gain between the user equipment j and a serving cell i and the summation runs over all path gains for all users served by all cells k different from cell i.

In what follows there will be provided a few examples related to the power control in Long Term Evolution Networks, LTE networks. These examples are merely illustrative and does not constitute any limitations for the proposed technology. The proposed technology may on the contrary be used in all types of networks that utilizes power control for determining the transmit power to be used on physical channels. The power control expressions provided below are related to LTE but the particular form of the power control expression, and the parameters incorporated into them, does not limit the usefulness of the proposed technology since the use statistical measures of the geometry values and also their normalised forms can be used in all types of power control expressions that takes geometry into consideration.

Several power control expressions for physical channels in LTE have the following general form:

$P_{PHYS} = \text{Min}(P_{max}, \Omega)$, where $P_{PHYS}$ specifies the particular physical channel the expression relates to, the operation min specifies that the smallest of $P_{max}$ and $\Omega$ should be chosen and $\Omega$ is a general expression incorporating the particular parameters used for the particular physical channel. As an example, $\Omega$ have the form $\Omega = 10 \log_{10}(M) + P_0 + \alpha(j)PL + \delta_{MCS} + f$, in expression (*) below where $P_{PHYS}$ refers to $P_{PUSCH}$. PUSCH is in turn shorthand for the general term Physical Uplink Shared Channel.

The statistical measure $G^*$ may, according to the proposed technology, be added to such power control expressions in order to obtain a power control expression that takes into consideration the geometric information about possible interferences within the network, schematically one obtains:

$P_{PHYS} = \min(P_{max}, \Omega + G^*)$, or $P_{PHYS} = \min(P_{max}, \Omega + \beta G^*)$, depending on whether or not a scaling parameter β is used. Reference [1], TS 36.213 section 5—"Power control", provides explicit expressions for the power controls that are used in LTE.

In the example that follows the physical channel comprises a physical uplink channel and the proposed technology thus provides a way to determine the transmit power to be used by a particular UE on the physical uplink channel.

The 3GPP standard for LTE defines the UE transmitted power $P_{PUSCH}$ as follows:

$$P_{PUSCH} = \min(P_{max}, 10 \log_{10}(M) + P_0 + \alpha(j) \cdot PL + \delta_{MCS} + f) \quad (*)$$

where $P_{max}$ provides the maximum UE transmit power, M is the bandwidth of the PUSCH resource assignment expressed in number of resource blocks, $P_0$ is the desired or nominal value for $P_{PUSCH}$, $\alpha$ is the fractional power control parameter, PL is the downlink path loss estimated in the UE. The delta MCS parameter is denoted as $\delta_{MCS}$.

The term f(t) is defined by the recursive form $f(t)=f(t-1)+\delta_{PUSCH}(t-K_{PUSCH})$, where $\delta_{PUSCH}$ denotes a Transmit Power Control command, TPC command, received by the UE to implement closed loop power control, and $K_{PUSCH}$ is the processing delay. The control law used to define the TPC commands for each UE is given by $$\delta_{PUSCH}(t) = Q(P_0 - P_f(t)),$$

where, $$Q(u) = f \begin{cases} -1, & u \leq -0.5 \\ 0, & -0.5 < u \leq 0.5 \\ 1, & 0.5 < u \leq 2 \\ 3, & 2 < u \end{cases}$$

and $P_f(t)$ is the current estimate of the RX PSD.

Figure 1:
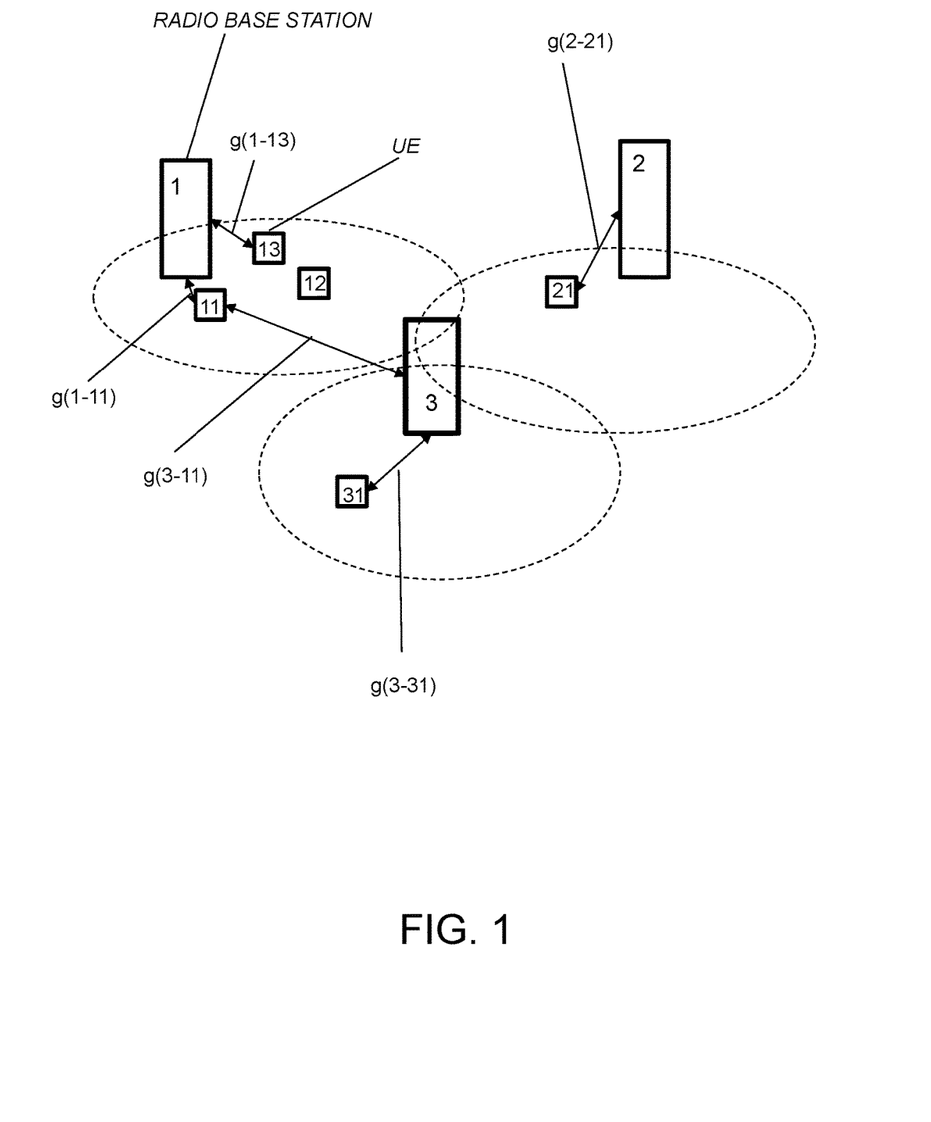
FIG. 1 is a schematic illustration of a cellular communication network.

In order to describe the geometry factors reference is made to FIG. 1. FIG. 1 provides a schematic picture of three cells, each with a base station, denoted 1, 2 and 3, respectively. The cells also comprises a number of UEs that are denoted 11, 12 and 13 for UEs in the cell comprising base station 1 while the UEs in the cell of base station 2 are denoted 21, 22, 23. UEs in the cell with base station 3 are equivalently denoted 31, 32 and 33. The symbols g(k-j) in FIG. 1 is intended to represent the path gains between base station k and User Equipment j. g(1-13) is for example intended to represent the path gain from UE 13 and base station 1.

If we now define, note the alternative notation as compared to above, $\bar{g}_{kj}$ as the path gain from user j to base station k in linear scale. We also use i to denote the serving base station for user j. The geometry factor provides a useful metric to characterise the level of interference generated by a specific user. The geometry factors obtained in downlink are given by the ratio between: the path gain to the serving cell; and, the sum of the path gains from the same user to the non-serving cells, as follows, here lin2db is an alternative way of writing 10 $\log_{10}$:

$$G_j^{DL} = lin2db\left(\frac{\bar{g}_{ij}}{\sum_{k \neq i} \bar{g}_{kj}}\right)$$

Note that the geometry factor for downlink is user centric, in the sense that it can be measured and computed by the user. It is in some sense a measure of the propensity of a UE to cause interference in the neighbouring cells.

Alternatively, a geometry factor for the uplink can be defined as the ratio between: the path gain of a specific user, j to their serving cell, i; and, the sum of the path gains from all users served by other cells to the specific user serving cell, i.e., here lin2db is an alternative way to write 10 $\log_{10}$ $$G_j^{UL} = lin2db\left(\frac{\bar{g}_{ij}}{\sum_{k \neq i} \bar{g}_{ik}}\right)$$

The geometry factor provides, as has been mentioned, a measure for potential interference. Users with high geometry factor will in general interfere less with neighbour cells than the users with low geometry factor.

For the case that uplink geometry factor is used, the network nodes such as the base stations can implement geometry based power control without modifications to the 3GPP standards. For the case that downlink geometry factor is used, the geometry based power control can be implemented by measurements in the UE.

Given the geometry factor values $G_j$ for the users j=1 . . . N, which can be obtained either from uplink or downlink according to above, it is possible to compute lower order statistical moments such as the mean value of the geometry factor values as well as representation of the variance in form of the standard deviation over all geometry factor values according to:

$$G_{mean} = \frac{1}{N}\sum_{j=1}^{N} G_j$$

$$G_{std} = \sqrt{\frac{1}{N}\sum_{j=1}^{N}(G_j - G_{mean})^2}$$

Having these one may compute particular statistical measures G* in the form of normalised geometry values. These are given by $$\bar{G}_j = \frac{(G_j - G_{mean})}{G_{std}}$$

The obtained and normalised geometry values can then be used to compute the transmit power from the expression:

$$P_{PUSCH} = \min(P_{max}, 10 \log_{10}(M) + P_0 + \alpha(j) \cdot PL + \delta_{MCS} + f + \beta \cdot \bar{G}_j)$$

The normalized geometry value has been added to the power control expression above in combination with scaling parameter $\beta$ as described earlier.

The various terms, beside the normalized geometry values, in this expression are well known, and may be allotted the following meanings:

$P_{max}$ represents the maximum transmission power that a particular user is allowed to use.

M is the number of resource blocks assigned to the user as indicated in the uplink scheduling grant.

$P_0$ provides a representation of the desired or nominal value for $P_{PUSCH}$. It is a user specific parameter which contains a user specific offset.

The symbol $\delta_{MCS}$ is a user specific parameter that adjusts the power setting on the basis of the assigned modulation and coding rate in order to arrive at the appropriate Signal to interference plus noise ratio, SINR, for the selected modulation and coding rate.

The symbol f is defined by a time dependent recursive form:

$$f(t)=f(t-1)+\delta_{PUSCH}(t-K_{PUSCH})$$

Here t is a time variable, t=1, 2, 3, . . . . The eNodeB makes small corrections to the transmit power by sending transmit power control, TPC, commands to the user. These commands take the form of incremental corrections, e.g. +1 means increase by 1 dB, which needs to be summed or accumulated by the user. The command at time sample time t is denoted $\delta_{PUSCH(T)}$. There is a processing delay of $K_{PUSCH}$ samples before each is used. Hence, f(t) represents the accumulation or sum of all of the increments up to time $t-K_{PUSCH}$.

The statistical measure in the form of normalized geometry values may also be used in other LTE power control expressions that are relevant for other physical channels. A particular example relates to the power control for the Physical Uplink Control Channel, PUCCH. The power control expression for PUCCH is given by:

$$P_{PUCCH} = \min(P_{max}, P_{0\_PUCCH} + PL + h(n_{CQI}, n_{HARQ}) + \Delta_{F\_PUCCH}(F) + f_{PUCCH}(t)),$$

According to the proposed technology this expression should be supplemented with the normalized geometry value, either alone or multiplied by the scaling parameter. Hence one obtains.

$$P_{PUCCH} = \min(P_{max}, P_{0\_PUCCH} + PL + h(n_{CQI}, n_{HARQ}) + \Delta_{F\_PUCCH}(F) + f_{PUCCH}(t) + \beta G^*)$$

The various terms, beside the geometry value, used in the expressions above have the following meaning:

$P_{max}$ represents the maximum transmission power that a user can use.

The symbol $h(nCQI, nHARQ)$ is an adjustment parameter based on the number of CQI information bits being transmitted in the control channel.

$\Delta_{F\_PUCCH(f)}$ is a power-adjustment parameter based on the transmitted PUCCH format. The symbol $f_{PUCCH(t)}$ is the accumulated sum of the PUCCH TPC commands.

Beside the explicitly provided examples the normalized geometry values may also supplement other LTE power control expressions.

The proposed technology also provides a network node 10 configured to determine the transmit power to be used for transmissions on physical channels. The network node 10 is configured obtain values for the geometry factors G of a set of User Equipments, UEs. The network node 10 is also configured to create, based on the obtained geometry factors and representations of the statistical moments of the geometry factors, a statistical measure G* for said set of UEs. The network node 10 is also configured to determine a value representing the transmission power for physical channel transmissions based on a power control expression for physical channel transmissions comprising the statistical measure G* for the set of UEs, and set the transmission power to the determined value.

According to a particular exemplary embodiment of the proposed technology there is provide a network node 10 that is configured to create a statistical measure G* from statistical moments that comprises the mean value of the geometry factors and the variance of the geometry factors wherein the representation of the variance comprises the standard deviation.

Still another embodiment of the proposed technology provides a network node 10 that is configured to create, based on the obtained geometry factors, the created mean value and the created standard deviation, a representation of a statistical measure G* for the set of UEs that comprises a normalized mean value G* of the geometry factors.

A particular embodiment of a network node 10 comprises a network node 10 that is further configured to incorporate the constructed statistical measure G* as a parameter in a power control expression for physical channel transmissions thereby providing a geometry distribution based power control expression. The network node 10 is also configured to extract, from the geometry distribution based power control expression, a value representing the transmission power for physical channel transmissions and setting the transmission power to the extracted value.

Still another embodiment of a network node 10 according to the proposed technology provides a network node 10 that is configured to determine the transmission power for the physical channel based on a power control expression that comprises the statistical measure G* multiplied by a scaling parameter β that enables an alteration of the weight given to the statistical measure G* in the power control expression for physical channel transmissions.

By way of example, the proposed technology provides a network node 10 where the network node 10 is configured to includes the statistical measure, or the statistical measure multiplied with the scaling parameter β, in a Long Term Evolution, LTE, power control expression to obtain a geometry distribution based power control for LTE According to a particular embodiment there is provided a network node 10 wherein the physical channel comprises a physical uplink channel and wherein the network node is configured to determine the transmission power for transmissions on the physical uplink channel.

Still another possible embodiment provides a network node 10, wherein the network node 10 is configured to determine the transmission power for transmissions on a Physical Uplink Shared Channel, PUSCH.

An exemplary embodiment of the a network node provides a network node 10 wherein the network node 10 is configured to determine the transmission power for the uplink channel based on the following expression for the power control for the Physical Uplink Shared Channel, PUSCH:

$$P_{PUSCH} = \min(P_{max}, 10 \log_{10}(M) + P_0 + \alpha(j)PL + \delta_{MCS} + f + \beta G^*),$$

where, min refers to the smallest of $P_{max}$ or $(10 \log_{10}(M) + P_0 + \alpha(j)PL + \delta_{MCS} + f + \beta G^*)$, and where:

$P_{max}$ represent the maximum transmission power that a network node can use;

$10 \log_{10}(M)$ provides a representation of the bandwidth of the PUSCH resource assignment expressed in number of resource blocks;

$P_0$ provides a representation of the desired or nominal value for $P_{PUSCH}$;

$\alpha(j)$ provides a representation of the fractional power control parameter, PL provides a representation of the downlink path loss as estimated by the network node;

$\delta_{MCS}$ represents of the delta MCS value;

f is defined by a time dependent recursive form $f(t)=f(t-1)+\iota_{PUSCH}(t-K_{PUSCH})$, where $\delta_{PUSCH}$ denotes a TPC command to implement closed loop power control, and $K_{PUSCH}$ is the processing delay; and where $\beta G^*$ is the statistical measure G* multiplied by the scaling parameter β.

In still another embodiment of the proposed technology there is provided a network node where the network node is configured to obtain the geometry factor values G for the set of UEs from downlink data.

In a particular embodiment of a network node according to the proposed technology there is provided a network node configured to obtain the geometry factor value $G_j$ for a particular user equipment j from the following expression:

$$G_j^{DL} = 10 \log_{10}\left(\frac{g_{ij}}{\sum_{k \neq i} g_{kj}}\right),$$

where:

$g_{ij}$ represents the path gain between a user equipment j and a serving cell i and the summation runs over all path gains from user equipment j and non-serving cells k.

By way of example the network node is, in a possible embodiment of the proposed technology, configured to obtain the geometry factor values for the set of UEs from uplink data.

An alternative example of a network node provides a network node that is configured to obtain a geometry factor value $G_j$ for a particular user equipment j from the following expression:

$$G_j^{UL} = 10\log_{10}\left(\frac{g_{ij}}{\sum_{k \neq i} g_{ik}}\right),$$

where:

$g_{ij}$ represents the path gain between the user equipment j and a serving cell i and the summation runs over all path gains for all users served by all cells k different from cell i.

Figure 4:
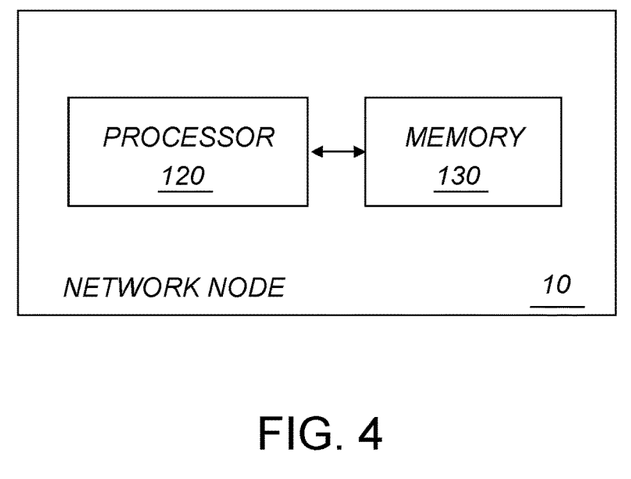
FIG. 4 is a block diagram illustrating an embodiment of a network node according to the proposed technology.

A particular version of the described embodiments provides a network node that comprises a processor 120 and a memory 130, said memory 130 comprising instructions executable by the processor, whereby the processor is operative to determine the transmission power to be used for transmissions on a physical channel. FIG. 4 is a schematic block diagram illustrating an example of a network node comprising a processor and an associated memory. In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Still another exemplary version provides a network node according to any of the described embodiments where the network node also comprises communication circuitry 110.

Figure 5:
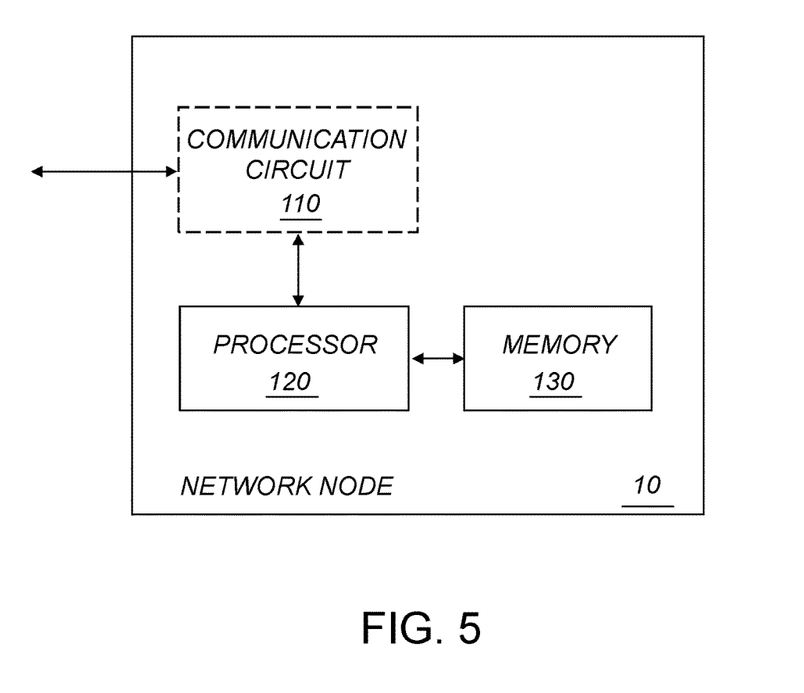
FIG. 5 is a block diagram illustrating another embodiment of a network node according to the proposed technology.

The communication circuitry 110 may include functions for wired and/or wireless communication with other devices and/or network nodes in the network. In a particular example, the wireless device, UE, network node may include radio circuitry for communication with one or more other nodes, including transmitting and/or receiving information. The communication circuitry 110 may be interconnected to the processor and/or memory. FIG. 5 is a schematic block diagram illustrating an example of a network node comprising a processor and an associated memory and a communication circuitry.

The described network node may be a radio base station, such as an eNodeB, that determines the transmit power to be used by a User Equipment for transmission on physical channel. The network node may also be a user equipment that determines suitable transmit power levels based on a power control expression that comprises geometric information. The UE may be provided with the geometry factor values from an external source, for example a radio base station serving the UE, and perform the calculations to enable a determination of suitable power level.

As used herein, the non-limiting term "User Equipment" or "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like. The term network node may also refer to a User Equipment, UE as mentioned above.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

In a particular embodiment, a computer program comprising instructions, which when executed by at least one processor, cause the processor(s) to:

read information related to the values of the geometry factors G of a set of User Equipments, UEs, compute, based on the obtained geometry factor values, representations of statistical moments of the geometry factor values, construct, based on the obtained geometry factor values G and the representations of the statistical moments, a statistical measure G* for the set of UEs, determine a value representing the transmission power for physical channel transmissions based on a power control expression for physical channel transmissions comprising the statistical measure G* for the set of UEs, and setting the transmission power to the determined value.

Figure 6:
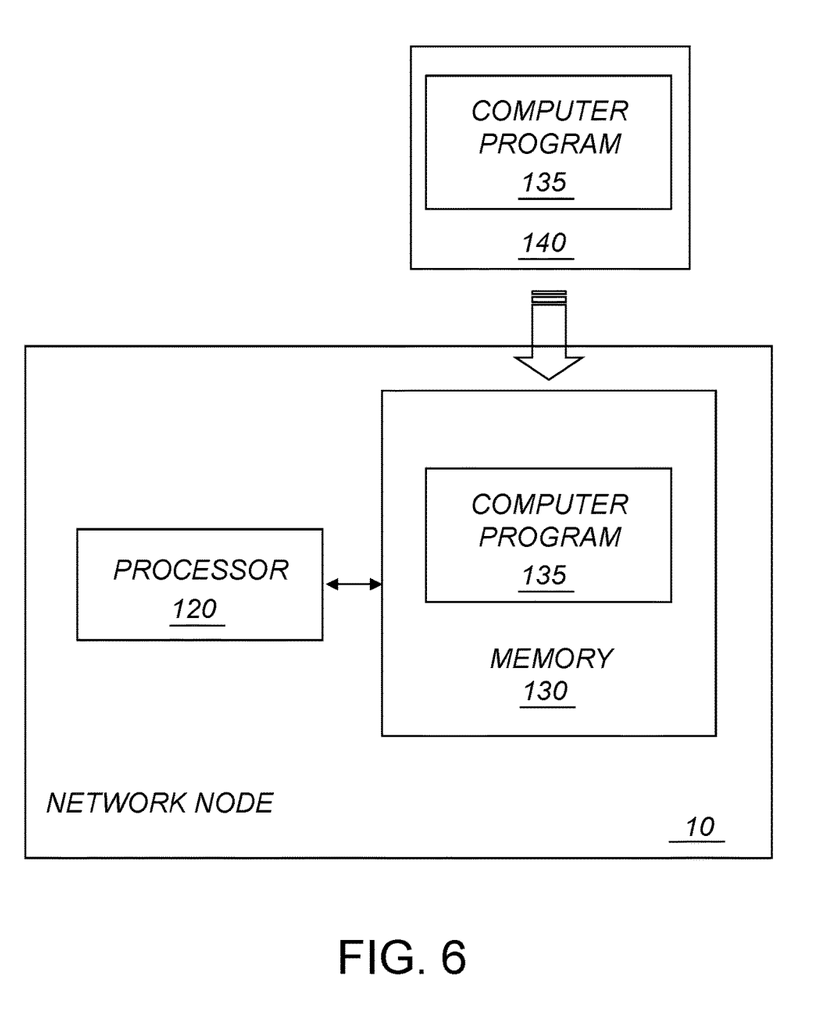
FIG. 6 is a block diagram illustrating still another embodiment of a network node according to the proposed technology where the network node is using a computer program and a computer program product according to the proposed technology.

The proposed technology also provides a computer program product comprising the described computer program. FIG. 6 illustrates the use of a computer program product 140 comprising the computer program 135 by a network node 10

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 7.

Figure 7:
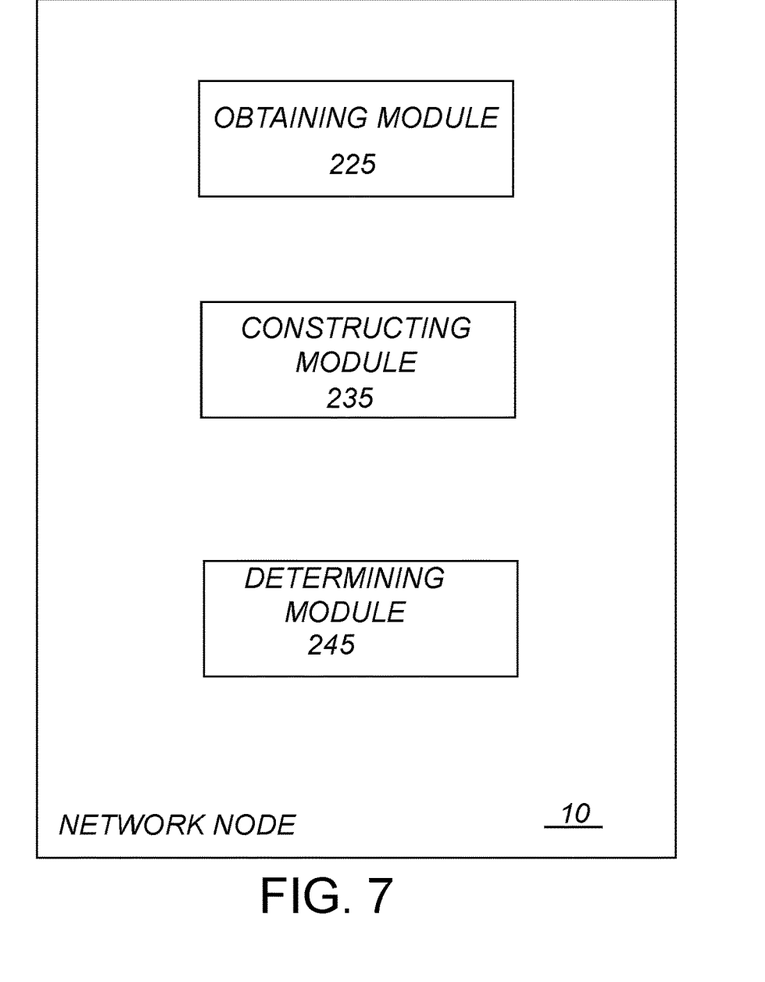
FIG. 7 is a block diagram illustrating an exemplary embodiment of a network node according to the proposed technology.

FIG. 7 is a schematic block diagram illustrating an example of a network node comprising a group of function modules. The network node 10 is configured to determine the transmit power to be used for transmissions on physical channels. The network node 10 comprises an obtaining module 225 for obtaining values for the geometry factors G of a set of User Equipments, UEs. The network node also comprises a creating module 235, for creating, based on the obtained geometry factors and representations of the statistical moments of the geometry factors, a statistical measure G* for the set of UEs. The network node 10 also comprises a determining module 245 for determining a value representing the transmission power for physical channel transmissions based on a power control expression for physical channel transmissions comprising the statistical measure G* for the set of UEs, and setting the transmission power to the determined value Alternatively it is possibly to realize the modules in FIG. 7 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] TS 36.213 SECTION 5—"POWER CONTROL"

The invention claimed is:

1. A method performed by a network node for determining the transmit power to be used for transmissions on physical channels, wherein the method comprises the steps of:

obtaining, by an obtaining module, values for geometry factors G of a set of User Equipments (UEs);

creating, by a constructing module, based on the obtained geometry factors and representations of statistical moments of the geometry factors, a statistical measure G* for said set of UEs; and determining, by a determining module, a value representing the transmission power for physical channel transmissions based on a power control expression for physical channel transmissions comprising the statistical measure G* multiplied with a scaling parameter R, said scaling parameter enabling weight given to a normalized geometry value G* in the power control expression for physical channel transmissions to be altered.

2. The method according to claim 1, wherein said statistical moments comprise the mean value of the geometry factors and the variance of the geometry factors and wherein the representation of said variance comprises the standard deviation.

3. The method according to claim 2, wherein the step of creating a representation of a statistical measure G* for said set of UEs comprises to create a normalized mean value G* of the geometry factors based on the obtained geometry factors, the created mean value and the created standard deviation.

4. The method according to claim 1, wherein the step of determining a value representing the transmission power for physical channel transmissions comprises the steps of:

incorporating the created statistical measure G* as a parameter in a power control expression for physical channel transmissions thereby providing a geometry distribution based power control expression;

extracting, from the geometry distribution based power control expression P, a value representing the transmission power for physical channel transmissions and setting the transmission power to the extracted value.

5. The method according to claim 1, wherein the statistical measure, or the statistical measure multiplied with the scaling parameter β, is included in a power control expression for transmissions on physical channels in a Long Term Evolution (LTE) system, LTE system, in order to obtain a geometry distribution based power control for LTE.

6. The method according to claim 1, wherein the transmission power is determined for transmissions on the uplink channel.

7. The method of claim 1, wherein the transmission power is determined for transmissions on a Physical Uplink Shared Channel (PUSCH).

8. The method according to claim 7, wherein the transmission power for the uplink channel is obtained from the following expression for the power control for the Physical Uplink Shared Channel, PUSCH:

$$P_{PUSCH} = min(P_{max}, 10 \log_{10}(M) + P_0 + \alpha(j) \cdot PL + \delta_{MCS} + f + \beta G^*),$$

where, min refers to the smallest of $P_{max}$ or $(10 \log(M) + P_0 + \alpha(j) \cdot PL + \delta_{MCS} + f + \beta G^*)$, and where:

$P_{max}$ represent the maximum transmission power that a network node can use; and where $10 \log 10(M)$ provides a representation of the bandwidth of the PUSCH resource assignment expressed in number of resource blocks; and where $P_0$ provides a representation of the desired or nominal value for $P_{PUSCH}$; and where $\alpha(j)$ provides a representation of the fractional power control parameter; and where PL provides a representation of the downlink path loss as estimated by the network node; and where $\delta_{MCS}$ represents the delta MCS value; and where f is defined by a time dependent recursive form $f(t) = f(t-1) + \delta_{PUSCH}(t - K_{PUSCH})$, where $\delta_{PUSCH}$ denotes a TPC command to implement closed loop power control, and $K_{PUSCH}$ is the processing delay; and where $\beta G^*$ is the statistical measure multiplied by the scaling parameter β.

9. The method according to claim 7, wherein a geometry factor value G for a particular user equipment j is obtained from the following expression:

$$G_j^{DL} = 10 \log_{10}\left(\frac{g_{ij}}{\sum_{k \neq i} g_{kj}}\right),$$

where:

$g_{ij}$ represents the path gain between a user equipment j and a serving cell i and the summation runs over all path gains from user equipment j and non-serving cells k.

10. The method according to any of the claim 1, wherein the geometry factor values G, for the set of UEs are obtained from downlink data.

11. The method according to claim 10, wherein a geometry factor value $G_j$ for a particular user equipment j is obtained from the following expression:

$$G_j^{UL} = 10 \log_{10}\left(\frac{g_{ij}}{\sum_{k \neq i} g_{ik}}\right),$$

where:

$g_{ij}$ represents the path gain between the user equipment j and a serving cell i and the summation runs over all path gains for all users served by all cells k different from cell i.

12. The method according to any of the claim 1, wherein the geometry factor values for the set of UEs are obtained from uplink data.

13. A network node configured to determine the transmit power to be used for transmissions on physical channels, wherein the network node comprises:

an obtaining module configured to obtain values for the geometry factors G of a set of User Equipments (UEs); and a constructing module configured to create, based on the obtained geometry factors and representations of statistical moments of the geometry factors, a statistical measure G* for said set of UEs; and a determining module configured to determine a value representing the transmission power for physical channel transmissions based on a power control expression for physical channel transmissions comprising the statistical measure G* multiplied with a scaling parameter β, said scaling parameter enabling weight given to the normalized geometry value G* in the power control expression for physical channel transmissions to be altered.

14. The network node according to claim 13, wherein the network node is configured to create a statistical measure G* from statistical moments that comprises the mean value of the geometry factors and the variance of the geometry factors wherein the representation of said variance comprises the standard deviation.

15. The network node according to claim 14, wherein the network node is configured to create, based on the obtained geometry factors, the created mean value and the created standard deviation, a representation of a statistical measure G* for said set of UEs that comprises a normalized mean value G* of the geometry factors.

16. The network node according to claim 13, wherein:

the network node is further configured to incorporate the constructed statistical measure G* as a parameter in a power control expression for physical channel transmissions thereby providing a geometry distribution based power control expression; and wherein the network node is configured to extract, from the geometry distribution based power control expression, a value representing the transmission power for physical channel transmissions and setting the transmission power to the extracted value.

17. The network node according to claim 13, wherein the network node is configured to include the statistical measure, or the statistical measure multiplied with the scaling parameter β, in a Long Term Evolution (LTE) power control expression to obtain a geometry distribution based power control for LTE.

18. The network node according to claim 13, wherein the physical channel comprises a physical uplink channel and wherein the network node is configured to determine the transmission power for transmissions on the physical uplink channel.

* * * * *